US010918005B2

(12) United States Patent
Steinlage et al.

(10) Patent No.: US 10,918,005 B2
(45) Date of Patent: Feb. 16, 2021

(54) IMPLEMENT WEIGHT TRANSFER MONITORING AND WING CONTROL

(71) Applicant: DEERE & COMPANY, Moline, IL (US)

(72) Inventors: David L. Steinlage, Ankeny, IA (US); Shawn J. Becker, Ankeny, IA (US); Adam D. Sporrer, Ankeny, IA (US); Ricky B. Theilen, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 107 days.

(21) Appl. No.: 15/987,017

(22) Filed: May 23, 2018

(65) Prior Publication Data
US 2019/0357418 A1 Nov. 28, 2019

(51) Int. Cl.
*A01B 63/32* (2006.01)
*A01B 49/02* (2006.01)

(52) U.S. Cl.
CPC ............ *A01B 63/32* (2013.01); *A01B 49/027* (2013.01)

(58) Field of Classification Search
CPC .............................. A01B 63/32; A01B 49/027
See application file for complete search history.

(56) References Cited

U.S. PATENT DOCUMENTS

| | | | | |
|---|---|---|---|---|
| 3,700,041 A | * | 10/1972 | Ryan | A01B 63/22 172/316 |
| 4,427,207 A | * | 1/1984 | Gafford | A01B 63/22 172/401 |
| 4,519,460 A | * | 5/1985 | Gust | A01B 49/027 111/136 |
| 4,600,060 A | * | 7/1986 | Winter | A01B 63/32 172/4 |
| 6,305,478 B1 | * | 10/2001 | Friggstad | A01B 63/32 172/4 |
| 6,318,477 B1 | * | 11/2001 | Bettin | A01B 63/32 172/452 |
| 8,162,070 B2 | * | 4/2012 | Smith | G05D 19/02 172/2 |
| 8,794,344 B2 | * | 8/2014 | Blunier | A01B 63/32 111/200 |

(Continued)

FOREIGN PATENT DOCUMENTS

| | | |
|---|---|---|
| EP | 2269432 | 4/2013 |
| EP | 2583545 | 10/2014 |

(Continued)

OTHER PUBLICATIONS

European Search Report for European Patent Application No. EP 19175243.5 dated Nov. 11, 2019 in 8 pages.

*Primary Examiner* — Jessica H Lutz
(74) *Attorney, Agent, or Firm* — Taft Stettinius & Hollister LLP; Stephen F. Rost

(57) ABSTRACT

A work machine with a first tire having a first tire pressure sensor configured to identify a first tire pressure, a load sensor coupled to the work machine and configured to measure an actual load weight, and a controller in communication with the first tire pressure sensor and the load sensor. Wherein, the controller identifies a tire pressure value with the first tire pressure sensor and the controller determines a current load weight threshold from a plurality of load weight thresholds with the tire pressure value.

20 Claims, 7 Drawing Sheets

(56) References Cited

U.S. PATENT DOCUMENTS

| | | | |
|---|---|---|---|
| 9,301,439 B2* | 4/2016 | Gilstring | A01B 49/027 |
| 9,651,536 B1* | 5/2017 | Lund | A01C 21/00 |
| 9,883,623 B2* | 2/2018 | Koch | A01B 73/065 |
| 10,117,377 B2* | 11/2018 | Dienst | A01B 63/22 |
| 10,314,223 B2* | 6/2019 | Stark | A01B 73/02 |
| 10,412,877 B2* | 9/2019 | Barrick | A01B 5/04 |
| 10,582,654 B2* | 3/2020 | Fanshier | A01C 7/205 |
| 2003/0127235 A1* | 7/2003 | Dannigkeit | A01B 63/22 |
| | | | 172/2 |
| 2010/0051298 A1* | 3/2010 | Smith | G05D 19/02 |
| | | | 172/2 |
| 2011/0231069 A1 | 9/2011 | Ryder et al. | |
| 2014/0000919 A1* | 1/2014 | Bachman | A01B 73/044 |
| | | | 172/1 |
| 2014/0214284 A1* | 7/2014 | Sauder | A01B 63/114 |
| | | | 701/50 |
| 2015/0013579 A1* | 1/2015 | Mariman | A01B 76/00 |
| | | | 111/59 |
| 2016/0029547 A1 | 2/2016 | Casper et al. | |
| 2016/0039480 A1 | 2/2016 | Pichlmaler | |
| 2016/0165789 A1* | 6/2016 | Gervais | A01C 7/105 |
| | | | 700/275 |
| 2017/0006758 A1* | 1/2017 | Dienst | A01B 63/22 |
| 2017/0251588 A1* | 9/2017 | Sporrer | A01B 63/008 |
| 2017/0347518 A1* | 12/2017 | Brooks | A01B 63/026 |
| 2018/0077849 A1* | 3/2018 | Fanshier | A01C 7/208 |
| 2018/0153089 A1* | 6/2018 | Sporrer | A01B 63/111 |
| 2018/0220574 A1* | 8/2018 | Peterson | A01B 69/003 |
| 2019/0000006 A1* | 1/2019 | Blunier | A01B 63/22 |
| 2019/0037761 A1* | 2/2019 | Andrews | A01B 63/111 |
| 2019/0129375 A1* | 5/2019 | Peterson | A01B 73/046 |
| 2019/0174666 A1* | 6/2019 | Manternach | A01B 76/00 |

FOREIGN PATENT DOCUMENTS

| | | |
|---|---|---|
| EP | 2889515 | 7/2015 |
| EP | 2676535 | 12/2015 |

* cited by examiner

IMPLEMENT WEIGHT TRANSFER MONITORING AND WING CONTROL

FIELD OF THE DISCLOSURE

The present disclosure relates to monitoring a load on an implement, and more particularly to monitoring a load on an implement to determine when a maximum tool depth is reached.

BACKGROUND OF THE DISCLOSURE

In the agricultural industry, wide implements such as field cultivators and the like include a main frame and adjacent outrigger or wing frames that are hinged or pivotably coupled thereto. Often, ground working tools are coupled to the frame sections and are positioned to interact with an underlying surface. Further, ground engaging mechanisms such as wheels are coupled to the frames to reposition the frame relative to the underlying surface. In this configuration, the distance between the wheels and the frame sets a working tool depth at which the ground working tools interact with the underlying surface. Often, the working tool depth is variable to accommodate different types of implements, different field conditions, and the like.

The wing frames are often hydraulically coupled to the main frame and configured to pivot between a stored position and a ground engaging position. When the wing frames are in the ground engaging position, the user sets the working tool depth either by manually manipulating the positioning of the wheels or by utilizing a user interface on the work machine to select a working tool depth. Regardless of the method used to set the working tool depth, the conventional implement typically alters working tool depth by altering the position of the wheels relative to the respective frame component. Accordingly, the conventional implement assumes the wheels or other ground engaging mechanisms are in contact with the underlying surface when determining working tool depth.

In the conventional implement system, the user may select a tool depth that is too deep for the implement based on the field conditions and the working tool that is engaging the field. For example, the user may set a deep working tool depth but the underlying surface may be dry and hard. In this situation, the working tools may not have sufficient weight pressing thereon to achieve the desired working tool depth. Accordingly, the conventional implement does not identify to the user when a working tool depth is implemented that is greater than the working conditions allow.

SUMMARY

One embodiment is an implement with a ground engaging mechanism, a load identifying sensor that identifies a load value acting on the ground engaging mechanism, and a controller in communication with the load identifying sensor. Wherein, when the load value is not within a load threshold, the controller initiates a response.

One example of this embodiment has a hydraulic system, wherein the load identifying sensor is a pressure sensor that identifies a pressure of the hydraulic system to determine the load value.

In another example, the ground engaging mechanism is a tire and the load identifying sensor is a tire pressure sensor that is monitored by the controller to determine the load value.

In yet another example, the ground engaging mechanism is a tire and the load identifying sensor is a tire deflection sensor that is monitored by the controller to determine the load value.

In one example of this embodiment, the load identifying sensor is strain gauge positioned to identify a load on the ground engaging mechanism, wherein the strain gauge is monitored by the controller to determine the load value.

In another example, the response is a signal to a user through a user interface.

Yet another example of this embodiment has a hydraulic system that repositions a first frame member relative to a second frame member, the hydraulic system in communication with the controller, wherein the response is a repositioning of the first frame member relative to the second frame member with the hydraulic system.

Another example includes a plurality of ground working mechanisms coupled to the implement, wherein the response is raising one or more of the ground working mechanism.

Another embodiment may be a system for monitoring engagement of an implement with an underlying surface that has a first frame segment, a second frame segment pivotally coupled to the first frame segment, a positioning system coupled to the first frame segment and the second frame segment, the positioning system configured to reposition the second frame segment relative to the first frame segment, a load sensor that identifies a load value acting on the second frame segment, and a controller in communication with the load sensor and the positioning system. Wherein, when the load value is not within a load threshold, the controller initiates a response.

In one example of this embodiment, the positioning system is a hydraulic system and the load value is a hydraulic pressure.

In another example the response initiated by the controller includes manipulating the orientation of the second segment relative to the first segment with the positioning system. One aspect of this example includes manipulating the orientation of the second segment relative to the first segment until the load value is within the load threshold.

Yet another example of this embodiment has a ground engaging mechanism coupled to the second frame segment, wherein the load sensor is coupled to the ground engaging mechanism.

Another example of this embodiment includes a plurality of ground working mechanisms, wherein the response initiated by the controller includes raising at least one ground working mechanism.

Yet another example has a disc assembly having an angle, wherein the response initiated by the controller includes changing the angle of the disc assembly.

In another example, the response initiated by the controller includes providing an indication with a user interface.

Yet another embodiment of the present disclosure includes a method of controlling the height of an implement over an underlying surface by providing a ground engaging mechanism, a load identifying sensor, and a controller in communication with the load identifying sensor, storing, in the controller, a load value threshold, monitoring, with the controller using the load identifying sensor, a load acting on the ground engaging mechanism, and initiating a response, with the controller, when the load acting on the ground engaging mechanism is not within the load value threshold.

One example of this embodiment includes controlling the implement tool depth, with the controller, and reducing the implement tool depth during the initiating the response step.

Yet another example includes providing a first ground working mechanism, a second ground working mechanism, and a user interface, storing a user preference, in the controller through input on the user interface, identifying a priority sequence for the first ground working mechanism and the second ground working mechanism, altering the orientation of first ground working mechanism and the second ground working mechanism in the priority sequence identified by the user preference during the initiating the response step.

Another example includes providing a first frame segment and a second frame segment pivotally coupled to one another with a hydraulic system, and applying increased hydraulic pressure, with the controller, to the hydraulic system to increase the torsional force applied between the first wing segment and the second wing segment as part of the initiating the response step.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
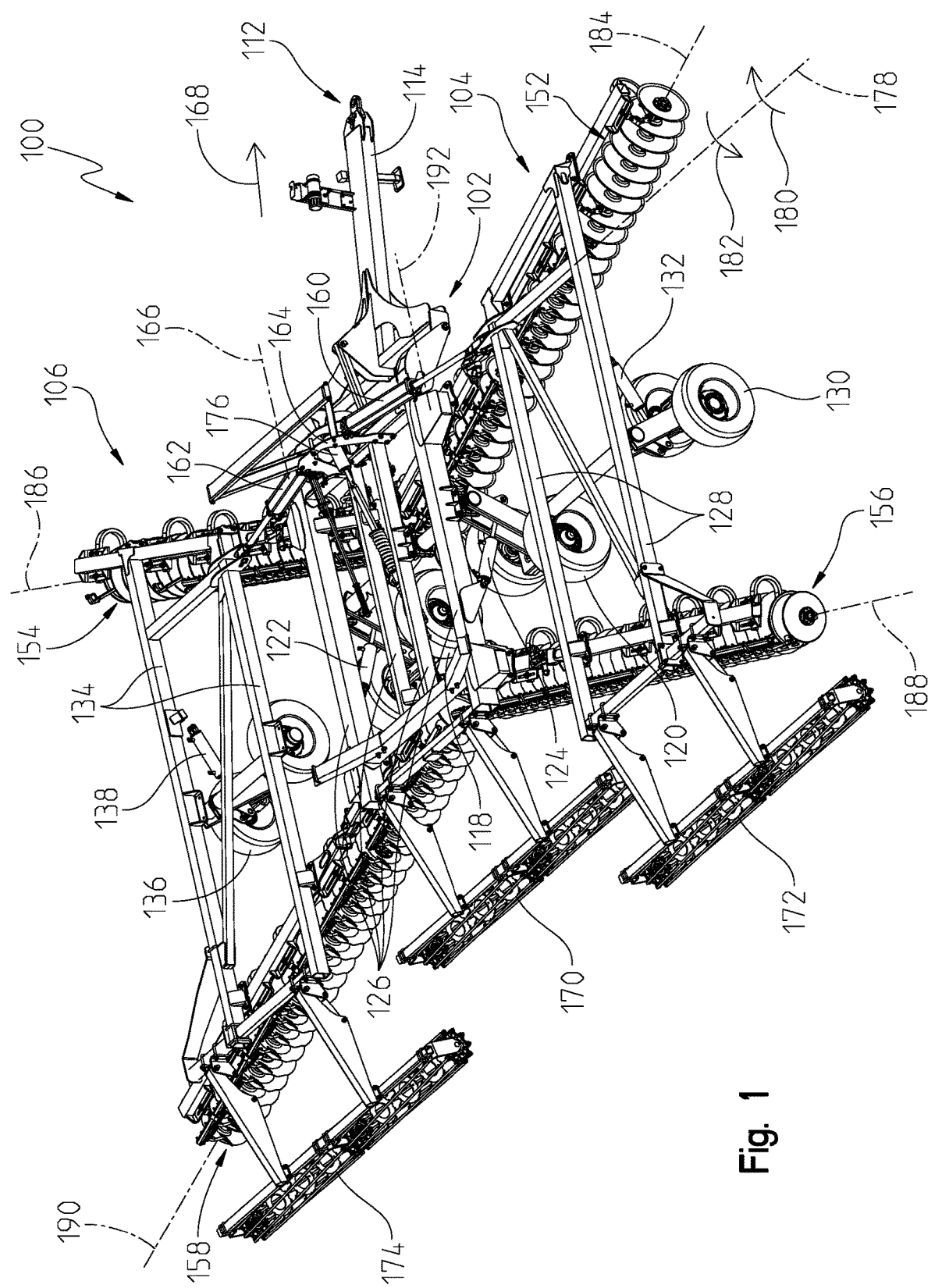
FIG. 1 is an elevated view of one embodiment of an agricultural implement.

Referring to FIG. 1, one non-exclusive example of an agricultural implement 100 is shown. The implement 100 is designed to couple to a work machine and perform a work function. For example, the implement may include work tools that penetrate into soil for many different reasons known to those familiar with the art of this disclosure. The implement 100 may be attached to a work machine or tractor (not shown) by a hitch assembly 112 such as a three-point hitch or a drawbar attachment. The hitch assembly 112 includes a hitch frame member 114 that extends longitudinally in a direction of travel for coupling to the work machine or tractor.

The agricultural implement 100 may include a transversely-extending frame that forms multiple frame sections. In FIG. 1, for example, the implement 100 includes a main or center frame 102. The main frame 102 is coupled to the hitch assembly 112 as shown. A first frame section or first inner frame 104 is disposed to one side of the main frame 102, and a second frame section or second inner frame 106 is disposed to an opposite side thereof.

While only a first and second frame section are shown coupled to the main frame, this disclosure also considers a third frame section coupled to an outside portion of the first frame section 104 and a fourth frame section coupled to an outside portion of the second frame section 106. Each frame section may be pivotably coupled to the frame section adjacent thereto. The first frame section 104, for example, may be pivotably coupled to the main frame 102. Similarly, the second frame section 106 may also be pivotably coupled to the main frame 102.

The implement 100 may be supported by a plurality of wheels. For example, the main frame 102 may be supported by a first pair of wheels 118 and a second pair of wheels 120. The first frame section 104 may be supported by a third pair of wheels 130 and the second frame section 106 may be supported by a fourth pair of wheels 136. While each section is shown being supported by a different pair of wheels, this is only shown in the illustrated embodiment to be one non-exclusive example. In other embodiments, there may be only a single wheel supporting each frame section. In a different embodiment, there may be more than a pair of wheels supporting each frame section. Moreover, the implement 100 may include one or more front wheels in addition to those described above. Further still, there may be back wheels disposed near the rear of the implement for additional support.

In the illustrated embodiment of FIG. 1, the agricultural implement 100 may include a plurality of actuators for controlling movement of the frame. Each actuator may be a hydraulic actuator, electric actuator, a pneumatic actuator, an electric motor, or any other known actuator or device. Moreover, each actuator may include an outer body or cylinder in which a rod or shaft and piston moves between an extended position and a retracted position. Further, one or more sensors may be positioned throughout the implement to identify the position of one or more of the actuators.

In FIG. 1, the main frame 102 includes a first actuator 122 and a second actuator 124. The first pair of wheels 118 may be coupled to the main frame 102 via a rock shaft that may be hydraulically actuated by the first actuator 122. The second pair of wheels 120 may be coupled to the main frame 102 via another rock shaft that may be hydraulically actuated by the second actuator 124. The actuators can raise or lower the main frame 102 relative to the wheels 118, 120. Further, one or more sensors may be coupled to the actuators, frame, or wheels to determine the height of the main frame 102 relative to the wheels 118, 120 or the pressure in the respective actuator 122, 124.

In FIG. 1, the main frame 102 includes a plurality of main frame members 126. A plurality of ground working tools 152, 154, 156, 158 may be at least partially coupled to the main frame members 126 for engaging an underlying surface or soil upon which the implement 100 travels. Similarly, the first frame section 104 includes a plurality of first frame members 128 and the second frame section 106 includes a plurality of second frame members 134. Each of these frame members may be at least partially coupled to one or more of the plurality of ground working tools 152, 154, 156, 158.

Also shown in FIG. 1 is a first side actuator 160 and a second side actuator 162. The first side actuator 160 may be pivotally coupled between the main frame section 102 and the first frame section 104. Similarly, the second side actuator 162 may be pivotally coupled between the main frame section 102 and the second frame section 106. More specifically, the main frame section 102 may have a support tower 164 providing an elevated coupling location for the first and second actuators 160, 162 relative to the coupling location on the corresponding first and second frame sections 104, 106.

In the above-described configuration, the first side actuator 160 may be selectively repositioned to provide varying levels of force on the corresponding first frame section 104 relative to the main frame section 102. More specifically, the first frame section 104 may be pivotable relative to the main frame section 102 about a first frame axis 192. Accordingly, repositioning or varying the linear displacement of the first side actuator 160 provides a torsional force on the first frame section 104 about the first frame axis 192.

Similarly, the second side actuator 162 may be selectively resized to provide varying levels of force on the corresponding second frame section 106. More specifically, the second frame section 106 may pivot relative to the main frame section 102 about a second frame axis 166. Accordingly, repositioning or varying the linear displacement of the second side actuator 162 provides a torsional force on the second frame section 106 about the second frame axis 166. In one embodiment, each actuator 160, 162 may also have a corresponding sensor identifying the linear displacement of each actuator 160, 162. Further still, in another embodiment each actuator 160, 162 may have a pressure sensor coupled thereto to identify the load on the respective actuator 160, 162.

While the first and second side actuators 160, 162 are shown and described towards the front direction 168 of the implement 100, this disclosure contemplates other locations for the actuators 160, 162. Further still, other embodiments may utilize more actuators than just the first and second side actuators 160, 162 to provide the torsional forces on the corresponding frame sections 104, 106. In one embodiment, additional actuators are located at a rear portion of the implement and spaced from the actuators 160, 162 in a direction opposite the front direction 168. In this embodiment, two actuators may apply a torsional force to the corresponding frame sections 104, 106 instead of just one. Further still, any number of actuators can be used per side to meet the needs of the particular implement application. Accordingly, this disclosure is not limited to any particular number of side actuators.

In yet another embodiment, additional frame sections may be pivotally coupled to the frame sections 104, 106 utilizing actuators similar to the first and second side actuators 160, 162 to adjust the corresponding relationship of the frame members. More specifically at least one side actuator may be positioned between each additional frame section similarly as described above for the first and second frame sections 104, 106.

In the embodiment shown in FIG. 1, rear ground working tools or attachments 170, 172, 174 are shown coupled to the corresponding frame sections 102, 104, 106. More specifically, a main rear attachment 170 is coupled to a rear portion of the main frame section 102, a first section rear attachment 172 is coupled to a rear portion of the first frame section 104, and a second section rear attachment 174 is coupled to a rear portion of the second frame section 106. The rear attachments 170, 172, 174 may be selectively coupled to the corresponding frame sections 102, 104, 106 or be configured to selectively engage the underlying surface. In one aspect of this embodiment, the rear attachments 170, 172, 174 may have an actuator and a position sensor or the like coupled thereto. In this configuration, the rear attachments 170, 172, 174 may be selectively raised off the underlying surface or pressed into the underlying surface. Further, the orientation and existence of the rear attachments 170, 172, 174, may alter the forces experienced by the corresponding frame section 102, 104, 106.

While the rear attachments 170, 172, 174 shown in FIG. 1 are flat-bar roller type rear attachments, this disclosure is not limited to such a configuration. Any rear attachment is considered herein, including, but not limited to harrow-type rear attachments as well.

In yet another aspect of the embodiment illustrated in FIG. 1, a fore-aft actuator 176 may be coupled to the main frame section 102. More specifically, the fore-aft actuator 176 may be coupled to a portion of the support tower 164 on a first end and to the main frame section 102 at a second end. The main frame section 102 and the corresponding first and second frame sections 104, 106 may be pivotally coupled to the hitch assembly 112 or other portion of the implement 100. More specifically, the frame sections 102, 104, 106 may pivot about a transverse axis 178 in a fore direction 180 or an aft direction 182. In this non-limiting example, the fore-aft actuator 176 may be selectively repositionable to alter the orientation of the frame sections 102, 104, 106 in the fore direction 180 or the aft direction 182 about the transverse axis 178. Further, the fore-aft actuator 176 may have a position sensor, pressure sensor, or the like coupled thereto that indicates the fore-aft position or load of the frame sections 102, 104, 106.

In yet another aspect of the embodiment shown in FIG. 1, a tool axis 184, 186, 188, 190 may be defined through each of the respective work tools 152, 154, 156, 158. Each tool axis 184, 186, 188, 190 may be adjustable relative to the transverse axis 178 to provide a different tool angle. By varying the tool angle of the work tools 152, 154, 156, 158, the implement can better accommodate different ground conditions. Accordingly, actuators and sensors or the like may also be coupled to the work tools 152, 154, 156, 158 to provide varying work tool angles.

While FIG. 1 represents an illustrated embodiment of an agricultural implement with three frame sections, this disclosure is not limited to this embodiment. Other embodiments may include only one section. Alternatively, there may be more than three frame sections in further embodiments. Thus, this disclosure is not limited to any number of frame sections, and the teachings herein may be applicable to any implement regardless of the number of frame sections it contains.

Figure 2:
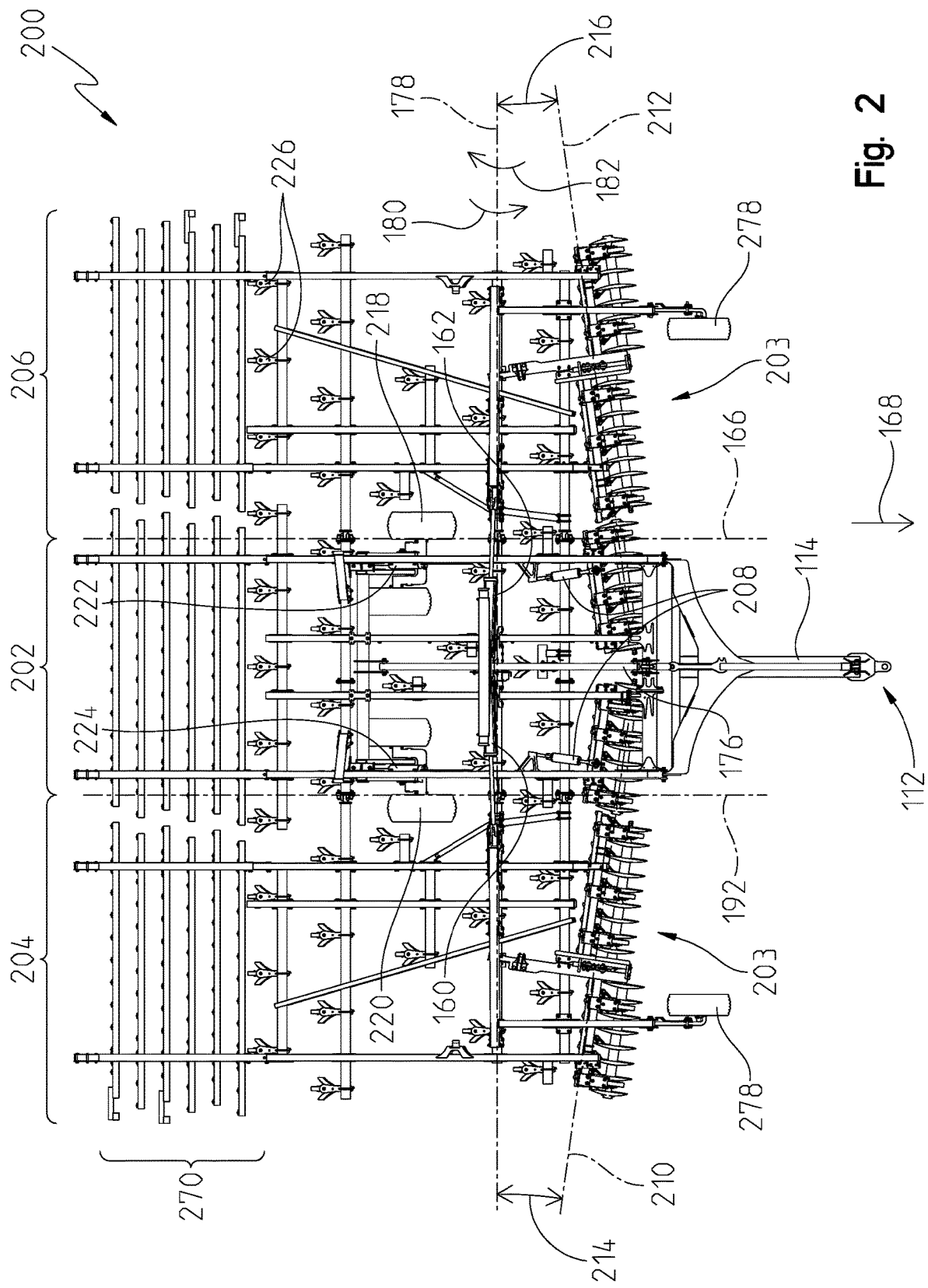
FIG. 2 is a top view of another embodiment of an agricultural implement.

Referring now to FIG. 2, another embodiment of an implement 200 is shown. The implement 200 may have many similar features of the implement 100 described above for FIG. 1. More specifically, the implement 200 may have a hitch assembly 112 and a hitch frame 114. The implement may have at least a main frame section 202 and a first and second frame section 204, 206 coupled thereto on either side. Further, a first and second pair of wheels 218, 220 may be pivotally coupled to the implement 200 via a first and second actuator 222, 224. Similarly, front wheels 278 may also be coupled to implement 200. Further, the implement 200 may also have a first and second side actuator 160, 162 configured to pivot the respective frame section 204, 206 about the corresponding frame axis 192, 166 as described above for FIG. 1. Further still, the implement 200 may also have a fore-aft actuator 176 configured to rotate the main frame about the transverse axis 178 as described above.

FIG. 2 also shows a plurality of front work tools 203 pivotally coupled to the corresponding frame sections 202, 204, 206. In the embodiment shown in FIG. 2, the plurality of front work tools 203 may be pivotally coupled to the corresponding frame sections 202, 204, 206 through one or more front work tool actuators 208. Similar to FIG. 1, the implement 200 of FIG. 2 may also define tool axis 210, 212 that may be selectively offset from the transverse axis 178 at a tool angle 214, 216. In one embodiment, the front tool actuator 208 may be repositionable to alter the tool angle 214, 216 of the plurality of front work tools 203. In yet another aspect of this example, one or more sensors may be coupled to the implement to determine the orientation of the plurality of front work tools 203.

The implement 200 may also have a plurality of rear work tools 226 that are different from the plurality of front work tools 203. In this embodiment, the fore-aft actuator 176 may control the tool depth of the plurality of front work tools 203 relative to the plurality of rear work tools 226. More specifically, while the first and second actuators 222, 224 may selectively reposition the corresponding first and second pairs of wheels 218, 220 relative to the frame, the fore-aft actuator 176 may control the fore-aft rotation 180, 182 of the implement 200 relative to the transverse axis 178. In other words, the first and second actuators 222, 224 may be repositionable along with the fore-aft actuator 176 to establish a desired tool depth for both the plurality of front work tools 203 and the plurality of rear work tools 226.

In one non-exclusive example, if the tool depth of the plurality of front work tools 203 is desired to be lower than the tool depth of the plurality of rear work tools 226, then the fore-aft actuator 176 may reposition to rotate the implement in the fore direction 180. Repositioning the implement in the fore direction may increase the tool depth of the plurality of front work tools 203 relative to the plurality of rear work tools 226. Alternatively, if the tool depth of the plurality of front work tools 203 is desired to be higher than the tool depth of the plurality of rear work tools 226, then the fore-aft actuator 176 may reposition to rotate the implement in the aft direction 182. Biasing the implement in the aft direction 182 decreases the tool depth of the plurality of front work tools 203 relative to the plurality of rear work tools 226.

The implement 200 may also have a rear attachment 270 removably coupled to each of the frame sections 202, 204, 206. The rear attachment 270 may be a harrow-type attachment that is removably coupled to the rear end of the corresponding frame sections 202, 204, 206. In one embodiment, the rear attachment 270 may also have an actuator and a position sensor that alters the amount of down pressure exerted by the rear attachment 270 on the underlying surface. Further still, the actuator of the rear attachments 270 may raise the attachment off the underlying surface as well.

Altering the position of any one of the components described above may also affect the positioning of the other components of the implement 100 or 200. More specifically, as described above for the implement 200 of FIG. 2, repositioning the fore-aft actuator 176 rotates the implement 200 in the fore or aft direction 180, 182, thereby changing the tool depth of the various tools coupled thereto. In yet another example, the existence and orientation of a rear attachment 170, 172, 174, 270 also affects the down force experienced by the rear portion of the implement, thereby affecting tool depth among other things. Further still, the depth and angular orientation of the work tools 152, 154, 156, 158, 203 can also affect the remaining components of the implement 100, 200 requiring the first and second side actuators 160, 162 to reposition the corresponding frame sections to ensure even distribution of force throughout the implement 100, 200 as it travels along the underlying surface.

Figure 3:
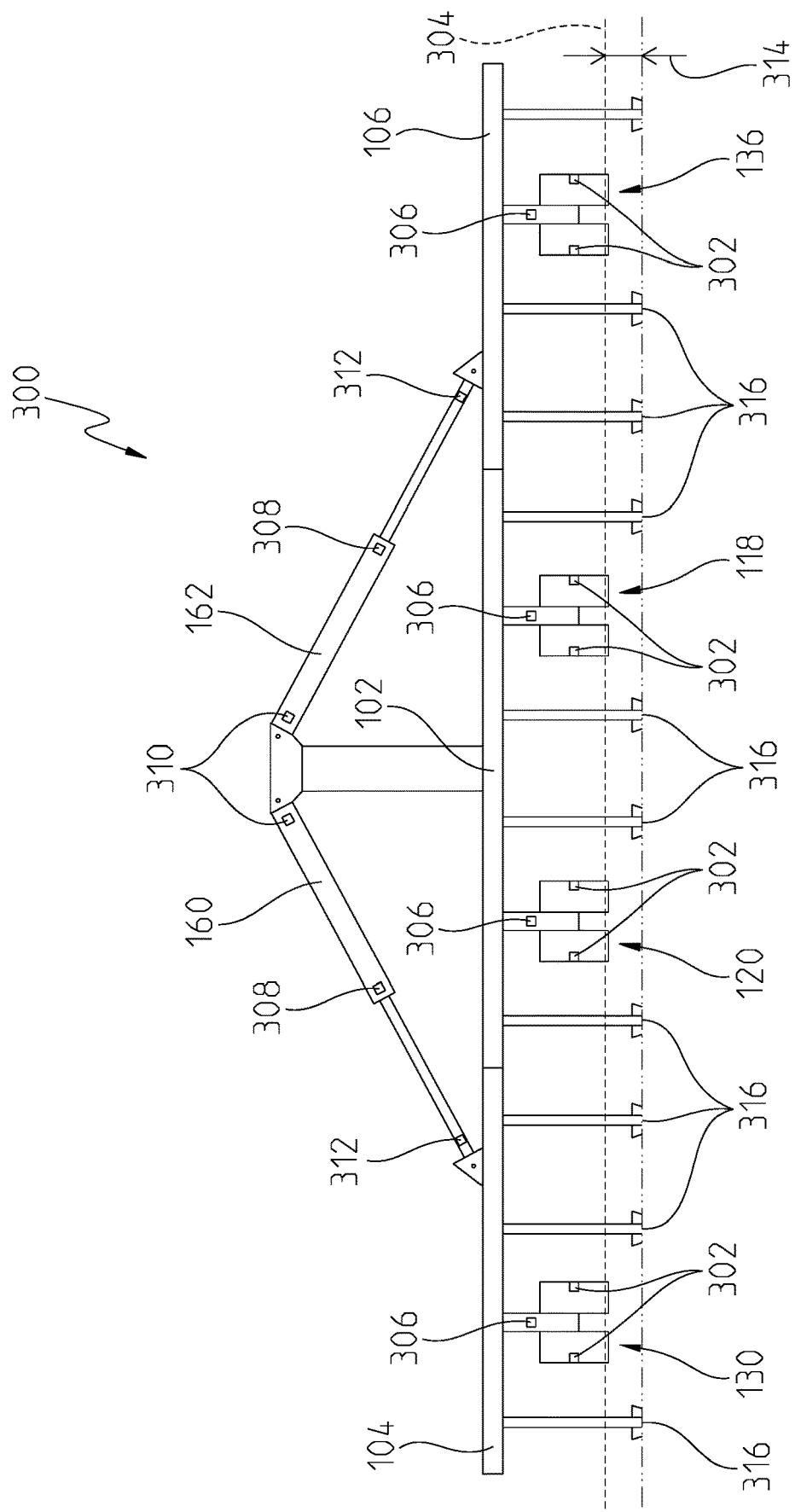
FIG. 3 is a front diagrammatical view of the implement of FIG. 1.

Referring now to FIG. 3, one non-exclusive example of this disclosure is illustrated. In FIG. 3, a plurality of sensors are shown positioned throughout the implement 300. The implement 300 may be substantially similar to the implement 100 or 200 shown and described above. More specifically, the implement 300 may have a center frame section 102 pivotally coupled to a first and second frame section 104, 106 as described above. Further, a first and second side actuator 160, 162 may be coupled to a hydraulic, pneumatic, electrical or the like system to selectively rotate the corresponding first and second frame sections 104, 106 relative to the central frame section 102. Further, the implement 300 may also have a first, second, third, and fourth pair of wheels 118, 120, 130, 136 similar to those described above for the implement 100.

The implement 300 may have a plurality of sensors positioned at different location throughout the implement. The sensors may be positioned to identify a forces acting on the corresponding components. More specifically, a tire sensor 302 may be positioned in each of the tires for each pair of wheels 118, 120, 130, 136. The tire sensor 302 may identify the tire pressure or deflection within the corresponding tire. In one non-exclusive example, the tire sensor 302 may be a sensor embedded in the tire that identifies the tire pressure, deflection, or other property of the tire to a controller 402 (see FIG. 4). Alternatively, the tire sensor 302 could be coupled to a rim of the corresponding wheel. Further still, the tire sensor 302 could be mounted outside of the cavity created between the tire and the corresponding wheel. Accordingly, this disclosure considers any type of tire sensor 302 known in the art and capable of determining a tire pressure or deflection.

In one example of this embodiment, the tire sensor 302 may communicate tire sensor values to the controller 402. The tire sensor 302 may communicate a signal to the controller 402 that is representative of the tire pressure or the deflection of the tire. In this non-exclusive example, the tire sensor 302 may be utilized by the controller 402 to identify a load acting on the tire. More specifically, the controller 402 may utilize the tire sensor 302 to identify when the tire is contacting the ground. For example, the controller 402 may establish a loaded tire pressure of the corresponding tire. When the controller 402 identifies the loaded tire pressure with the tire sensor 302, the controller 402 may determine that the corresponding tire is contacting an underlying surface 304. Alternatively, when the controller 402 identifies a tire pressure less than the loaded tire pressure threshold, the controller 402 may determine that the corresponding tire is not contacting the underlying surface 304.

Similarly, the tire sensor 302 may be a deflection sensor that identifies to the controller 402 when the corresponding tire is being deflected by the underlying surface 304. The controller 402 may utilize the deflection reading from the tire sensor 302 to determine when the corresponding tire is substantially contacting the underlying surface. In one example of this embodiment, when the controller 402 does not identify substantial deflection in the tire with the corresponding tire sensor 302, the controller 402 determines that tire is raised from the underlying surface 304.

The implement 300 may also have a wheel load sensor 306 positioned between the pair of wheels 118, 120, 130, 136 and the corresponding frame section 102, 104, 106. The wheel load sensor 306 may be a strain gauge or the like sensor that communicates a signal to the controller 402 that indicates a load applied by the pair of wheels 118, 120, 130, 136 to the corresponding frame section 102, 104, 106. In one non-limiting example, the wheel load sensor 306 may positioned on a structural component that couples the wheels to the corresponding frame.

In another example, the wheel load sensor 306 may be coupled to an actuator that is positioned to adjust the location of the corresponding pair of wheels 118, 120, 130, 136. In this configuration the wheel load sensor 306 may be a pressure sensor that communicates a pressure to the controller 402. The controller 402 can identify when a load is being applied to the corresponding pair of wheels 118, 120, 130, 136 based on the pressure identified by the wheel load sensor 306. In one non-exclusive example of this embodiment, the controller 402 may have a loaded wheel pressure threshold stored therein. When the wheel load sensor 306 identifies a pressure value from the actuator that is not within the loaded wheel pressure threshold, the controller 402 determines that the corresponding pair of wheels 118, 120, 130, 136 are not substantially contacting the underlying surface.

In yet another embodiment the controller 402 may monitor the first and second side actuators 160, 162. One example of this embodiment, each actuator 160, 162 may have a shaft side sensor 308 or a base side sensor 310 fluidly coupled to corresponding chambers of the actuators 160, 162. The shaft side sensors 308 may identify a retraction pressure of the corresponding actuators 160, 162 and the base side sensors 310 may identify an extension pressure of the corresponding actuators 160, 162. The sensors 308, 310 may be positioned at opposing chambers of the cylinders in actuators 160, 162 and separated by a piston as is known in the art.

In the configuration having shaft side sensors 308 or base side sensors 310 on the actuators 160, 162, the pressures identified in the sensors 308, 310 may be interpreted by the controller 402 to identify the load on the corresponding frame section 104, 106. More specifically, an actuator pressure threshold may be stored in the controller 402. The actuator pressure threshold may be a pressure value stored in the corresponding chamber of the actuator 160, 162 that is expected when the implement is properly engaging the underlying surface 304 with the work tools 152, 154, 156, 158. The pressure values identified by the sensors 308, 310 may be compared to the actuator pressure threshold to determine whether the implement is properly engaging the underlying surface 304.

In another embodiment of the present invention, the actuators 160, 162 may have a displacement sensor or the like coupled thereto to identify the length of the corresponding actuators 160, 162. The displacement sensor may identify the displacement of the shaft relative to the cylinder of each actuator 160, 162. In turn, the controller 402 may store therein the mounting locations of the actuators 160, 162 and be able to determine the orientation of the first and second frame sections 104, 106 relative to the central frame section 102 based on the value of the displacement of the actuators 160, 162 and the known geometry of the implement. Accordingly, in this embodiment the controller 402 may have displacement thresholds stored therein that correlate with situations when the implement 100 is properly engaging the underlying surface 304 with the wheels 118, 120, 130, 136 and the work tools 152, 154, 156, 158. In this configuration, the controller can and compare the displacement values identified by the displacement sensor with the displacement threshold to determine whether the frame sections 104, 106 are properly oriented with the central fame section 102.

In yet another embodiment of the present disclosure, the shafts of the actuators may have strain gauges 312 or other similar sensors positioned thereon. The strain gauges 312 may communicate with the controller 402 to identify the load being transferred between the actuator 160, 162 and the corresponding frame section 104, 106. In one example of this embodiment, the controller 402 may store an actuator strain threshold therein that indicates the frame sections 104, 106 are properly engaging the underlying surface 304. In this embodiment, the controller 402 may monitor the strain gauges 312 and identify when the strain gauges 312 indicate values that are not within the actuator strain threshold.

Figure 4:
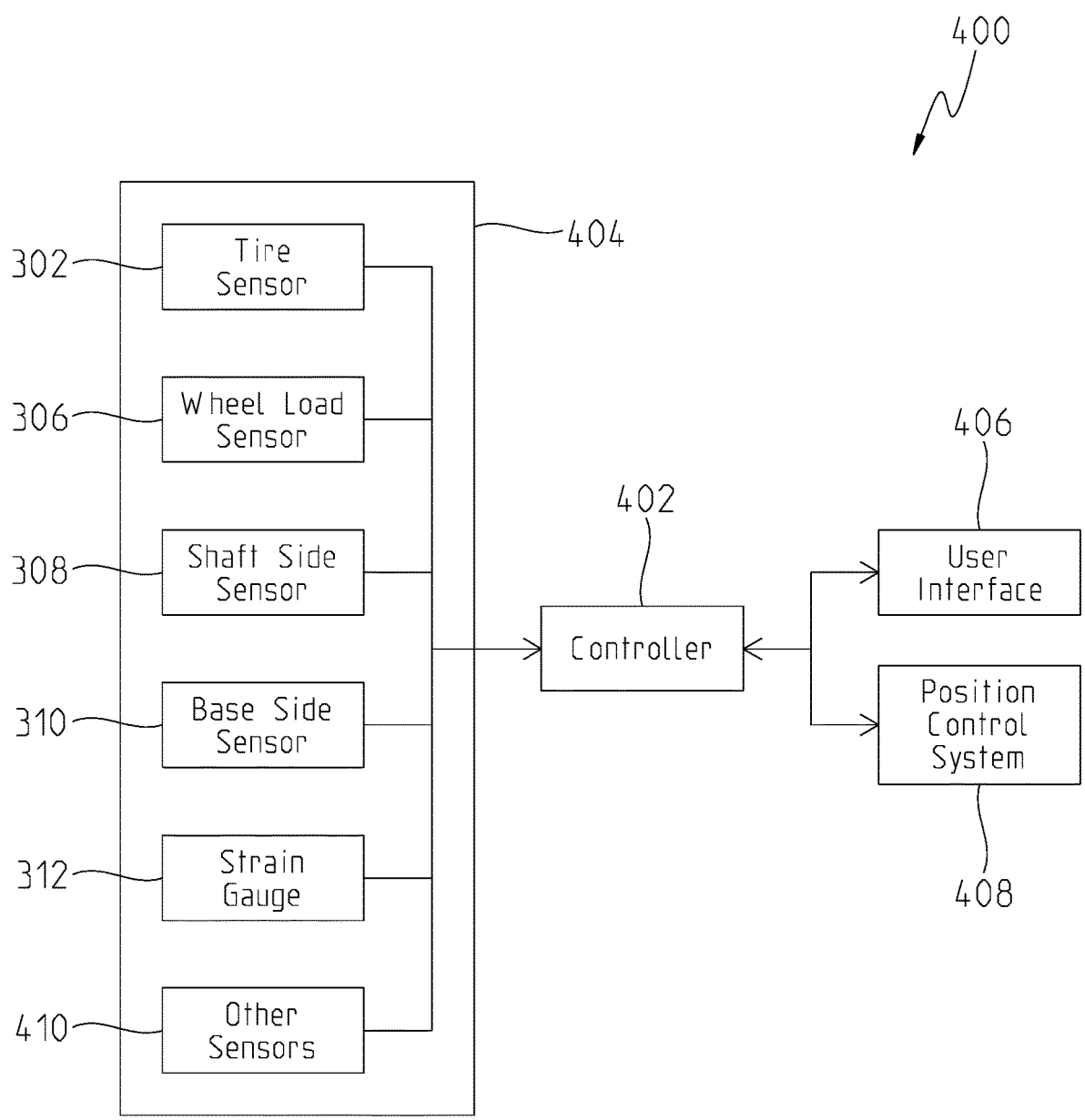
FIG. 4 is a diagram of a control system of the present disclosure.

Referring now to FIG. 4, one non-limiting example of the components of a control system 400 are illustrated. The control system 400 may have the controller 402 in communication with a plurality of sensors 404, a user interface 406, and a position control system 408 among other things. The controller 402 may have a memory unit and processor. The term controller is used herein to refer to one or more controller and is not limited to embodiments where only one controller is executing the functions described herein. More specifically, in one embodiment the controller 402 is a plurality of controllers stored in different locations. Further still, the memory unit of the controller 402 may be located as a component of the controller 402 or the controller 402 may access the memory unit from a remote location. Accordingly, this disclosure contemplates any controller, memory unit, and processing configuration known in the art, and the specific examples described herein are used for exemplary purposes.

The plurality of sensors 404 may include one or more of the tire sensor 302, the wheel load sensor 306, the shaft side sensor 308, the base side sensor 310, the strain gauge 312, or any other sensor 410 configured to identify the load condition of the implement 100. While many different sensors are illustrated in the plurality of sensors 404, this disclosure considers embodiments wherein any combination of the plurality of sensors 404 are in communication with the controller 402, including embodiments where the plurality of sensors 404 is only one of the sensors disclosed herein.

The plurality of sensors 404 may communicate with the controller using any communication protocol known in the art. More specifically, the plurality of sensors 404 may be in electrical communication with the controller through a wire harness or the like. In this configuration, the plurality of sensors 404 may transmit an electrical signal to the controller 402 through the wire harness. The electrical signal may be interpreted by the controller to indicate a corresponding value of the sensor as is known in the art. Alternatively, the plurality of sensors 404 may communicate with the controller 402 using any wireless protocol known in the art. In this configuration, the plurality of sensors 404 may not be electrically coupled to the controller 402 at all, but rather transmit the sensor reading to the controller 402 wirelessly.

The wireless configuration of the plurality of sensors 404 and the controller 402 contemplates embodiments where the controller 402 is located remotely from the plurality of sensors 404. More specifically, in one embodiment the plurality of sensors 404 may be located on the implement 100 while the controller 402 is located on a tractor. In other embodiments, the controller 402 may be located in an entirely separate location from the plurality of sensors 404. Accordingly, this disclosure contemplates many different communication protocols between the controller 402 and the plurality of sensors 404 and the specific embodiments used herein are meant only to be exemplary and not exclusive.

The plurality of sensors 404 may be any type of sensor capable of performing the functions described herein. For example, referring to the tire sensor 302, a person skilled in the relevant art understands the many different types of tire sensors that can be utilized to identify the pressure or deflection of a tire. Further, the wheel load sensor 306 and strain gauge 312 may be any sensor known in the art for identifying a load on a member. Similarly, the shaft side sensor 308 and the base side sensor 310 may be any sensor known in the art able to identify a fluid pressure. Accordingly, this disclosure considers any sensor known in the art that is capable of identifying the described information.

The user interface 406 may be any user interface known in the art. For example, in one non-exclusive embodiment the user interface is an indicator light or speaker that can provide visual or audible communication to the user. In another embodiment, the user interface 406 is a control monitor or the like that is capable of providing textual and graphical signals to the user. The user interface may also contain user inputs such as buttons or a touchscreen that allow the user to input signals to the controller 402. A person skilled in the art understands the many different types of user interfaces that could be used to implement the teachings of this disclosure and this disclosure considers other embodiments of a user interface not expressly discussed herein.

The position control system 408 may be a hydraulic, pneumatic, electric, or like system that can reposition the components of the implement. More specifically, in one embodiment, the position control system 408 contains linear actuators for the first and second side actuators 160, 162. In this configuration, the position control system 408 alter the positioning of the linear actuators to reposition the corresponding first and second frame sections 104, 106 relative to the central frame section 102. The position control system 408 may also control wheel actuators 122, 124, 132, 138 to reposition the corresponding wheels 118, 120, 130, 136 relative to the corresponding implement frame. Further still, the position control system 408 may also reposition the tool actuators 208. In yet another example, the position control system 408 may control the fore-aft actuator 176.

The position control system 408 may be an electric, electro-hydraulic, electro-pneumatic, or the like system wherein the controller 402 directs the movement of the actuators. Accordingly, the controller 402 may send commands to the position control system 408 to reposition the corresponding components of the implement responsive to a user input or the values identified by one or more of the plurality of sensors 404.

Figure 5:
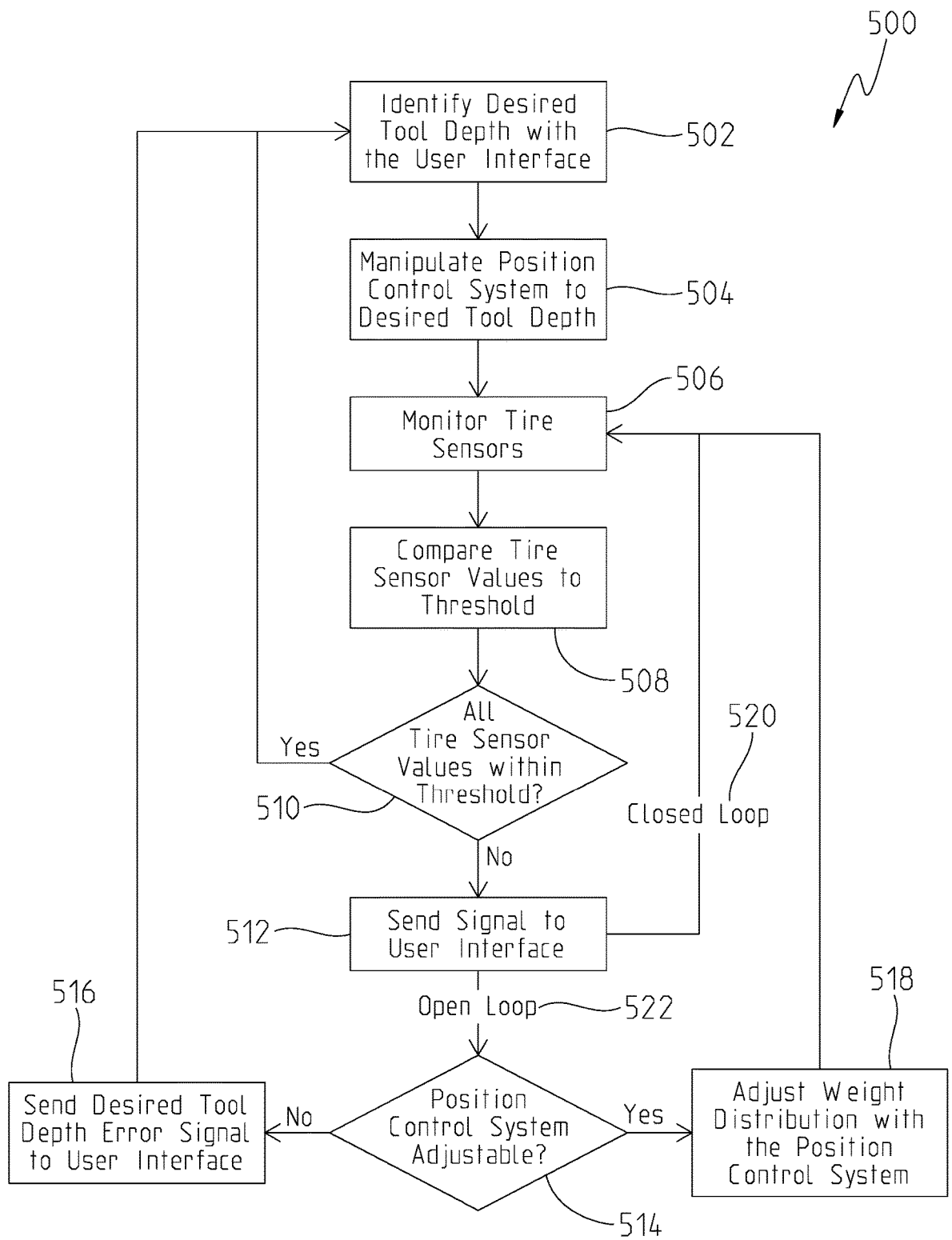
FIG. 5 is a flow chart illustrating one embodiment of a control logic utilizing tire sensors.

Referring now to FIG. 5, one non-exclusive example of an implement control logic 500 is illustrated. The control logic 500 may be executed by the controller 402. However, the control logic 500 may also be implemented in part by multiple controllers as described above, and this disclosure considers any number of controllers for implementing the control logic 500.

In one aspect of this disclosure, the control logic 500 may be configured to identify when a desired tool depth 314 is not being properly applied across the implement. More specifically, the controller 402 may monitor the tire sensors 302 to identify when the corresponding tires are not experiencing an expected load. As one non-limiting example, when the implement is properly engaging the underlying surface each of the tires will be experiencing at least a slight load. However, under certain circumstances the desired tool depth 314 may be too great for the conditions of the underlying surface 304 and thereby cause the implement to travel on the ground working tools (e.g. any one or more of tools 152, 154, 156, 158, 170, 172, 174, 203, 226, 270, collectively working tools 316) and substantially reduce the load experienced on the adjacent tire or tires.

In one non-exclusive example, the underlying surface 304 may be very dry and hard and thereby substantially restrict the ground working tools from becoming positioned in a desired depth 314. In this situation, the underlying surface is too hard and the ground working tools may not be able to penetrate the underlying surface to become positioned at the desired tool depth 314. In this scenario, the resistance between the ground working tools and the underlying surface 304 may affect the load experienced by the corresponding wheel or wheels.

In one non-exclusive example, the interaction between the ground working tools and the underlying surface 304 may elevate the corresponding wheel or wheels off the underlying surface 304. Accordingly, one aspect of this disclosure considers monitoring one or more tire sensor 302 to identify when the ground working tools are not properly positioned in the desired tool depth 314.

The implement control logic 500 may identify when a maximum tool depth is achieve by monitoring the tire sensors 302. More specifically, the controller 402 may first identify a desired tool depth in box 502. The desired tool depth may be identified from the user interface 406 or any other known method of selecting a tool depth. In one embodiment, the tool depth is input on a touchscreen device wherein the user selects or otherwise inputs the desired tool depth of the ground working tools. The desired tool depth may be identified as a distance measurement relative to the top plane of the underlying surface 304. In one non-exclusive example, the desired tool depth may be in inches, centimeters, or any other known measurement unit.

While the desired tool depth 314 is discussed herein as being identified from the user interface 406, other embodiments may not utilize the user interface 406 to set the desired tool depth 314 at all. More specifically, one embodiment of the present disclosure may involve the user manually adjusting the desired tool depth 314 of the implement. Accordingly, this disclosure considers both embodiments where the desired tool depth 314 is applied by the controller 402 with the position control system 408 and embodiments where the user applies the desired tool depth 314 manually.

In the embodiments utilizing the position control system 408 to implement the desired tool depth 314, the controller 402 may manipulate the position control system 408 to become oriented in the desired tool depth in box 504. More specifically, in this step the controller 402 may manipulate the wheel actuators 122, 124, 132, 138 to reposition the corresponding wheels 118, 120, 130, 136 relative to the corresponding implement frame 102, 104, 106. In turn, the effective penetration of the working tools on the underlying surface may be altered accordingly. The controller 402 may reposition the wheel actuators 122, 124, 132, 138 to a position that allows the working tools 316 to become oriented at the desired tool depth 314 under ideal conditions.

After the implement is oriented in the desired tool depth 314, the controller 402 may monitor the tire sensors 302 to determine the deflection or pressure in each of the tires on the implement in box 506. While one embodiment may utilize a tire sensor 302 in each of the tires of the wheels 118, 120, 130, 136, another embodiment may utilize tire sensors 302 in select tires of wheel 118, 120, 130, 136. In either case, the tire sensors 302 may be positioned to determine the load being applied to the tires across the width of the implement. In on non-exclusive example, at least one tire sensor 302 is coupled to a tire on each of the central frame section 102, the first frame section 104, and the second frame section 106.

In box 508, the controller 402 may compare the values identified by the tire sensors 302 in box 506 to a tire sensor threshold. The tire sensor threshold may be a tire pressure value that is expected when the tire is experiencing a minimum load applied from the frame of the implement. In other words, the tire sensor threshold may be a tire pressure value that is expected when the corresponding tire is in contact with the underlying surface.

Alternatively, or in addition to the pressure value reading, box 508 may compare a tire deflection identified in box 506 with a deflection threshold value. The deflection threshold value may be representative of the expected tire deflection when the tire is contacting the underlying surface 304. In this embodiment, when the load being applied to the tire is substantially reduced, indicating the tire is not substantially contacting the underlying surface 304, the tire deflection identified by the tire sensor 302 may not be within the deflection threshold value.

The controller 402 may compare each tire sensor 302 to the corresponding threshold values in box 510. More specifically, the tire pressure or deflection may be compared to a corresponding threshold value for each of the tire sensors 302. In box 510, the controller 402 may determine whether the tire sensors 302 are indicating values within the thresholds. If the tire sensors 302 are indicating values within the corresponding thresholds, the controller 402 determines that the corresponding tires are in proper contact with the underlying surface 304 and the desired tool depth 314 is therefore being achieved. Accordingly, if the tire sensor 302 values are within the corresponding threshold values the controller 402 may return to box 502 and continue executing boxes 502-510 based on any desired frequency to continually monitor the tire sensors 302 as a work operation is performed.

However, if the controller 402 identifies one or more tire sensor 302 value that is not within the corresponding threshold, the controller 402 may send a signal to the user interface 406 or the like in box 512 to indicate to the user the desired tool depth 314 is not properly implemented. More specifically, when one of the tire sensors 302 indicates a value that is not within the corresponding threshold value, the controller 402 determines that the tire is not properly contacting the underlying surface 304. This may occur when the working tools 316 are not properly penetrating the underlying surface 304 and thereby moving the corresponding tire away from the underlying surface 304.

In one embodiment of this disclosure, a closed loop system 520 may be implemented herein. In the closed loop system 520, the controller 402 may monitor the tire sensor 302 values and compare them to the corresponding thresholds as described above. When a tire sensor 302 indicates a value outside of the corresponding threshold value, the controller 402 may only execute box 512 and provide an indication to the user that the desired tool depth is not being properly implemented. In the closed loop 520 embodiment, the user may then adjust the desired tool depth or other components of the implement until the controller 402 identifies all of the tire sensor 302 values are within the desired thresholds.

A person skilled in the art understands the many ways an implement may be adjusted to increase the downforce applied in any given section, and the closed loop 520 system considers any form of adjustment that may be implemented by a user to address the section of the implement that is not properly contacting the underlying surface. More specifically, in one non-exclusive example the user may add weights to the corresponding section instead of adjusting the desired tool depth. Further, the user may manipulate the position control system 408 to adjust the implement to address the area identified by the controller in box 512. In another non-exclusive example, the user may adjust the positioning of the first or second actuator 160, 162 to address the section of the implement that is not within the threshold value. In yet another embodiment, the user may disengage several of the ground working tools 316 so the remaining tools may become properly positioned within the underlying surface 304 at the desired tool depth. Accordingly, this disclosure considers any known implement adjustment technique that provides increased down force on some or all of the ground working tools 316.

Another embodiment of the present disclosure includes an open loop option 522. The open loop option 522 may be implemented after the signal is sent to the user interface 406 in box 512 or it may not send a signal to the user interface 406 at all and box 514 may be implemented immediately after box 510. The open loop option 522 may be automatically implemented by the controller 402 to evenly distribute the loads across the implement. More specifically, when the controller 402 identifies a tire sensor 302 value that is not within the threshold in box 510, the controller 402 may automatically adjust the position control system 408 to redistribute the weight of the implement over the tire proximate to the tire sensor 302 indicating an out of threshold tire sensor value.

In one aspect of the open loop option 522, the controller 402 may determine whether the position control system 408 is further adjustable to provide additional downforce on the implement to the area proximate to the tire sensor 302 in box 514. If the position control system 408 is not further adjustable, the controller 402 may send a desired tool depth error signal to the user interface 406 in box 516. The controller 402 may implement box 516 when the position control system 408 cannot be further adjusted by the controller 402 to address the area that the tire sensor 302 indicates is not within the threshold value.

In one non-exclusive example, a tire on the third pair of wheels 130 of the first frame section 104 may have a tire sensor 302 value that is not within the threshold value. The controller 402 may have already extended the first side actuator 160 to a maximum extension or applied a maximum fluid pressure wherein the controller 402 cannot provide any additional downforce to the tire on the third pair of wheels 130. In this scenario, the controller 402 identifies in box 514 that the position control system 408 cannot be further adjusted to address the discrepancy identified by the tire sensor 302 and the controller 402 sends an error to the user in box 516.

In another example, the controller 402 may identify that providing additional downforce to one of the first or second frame sections 104, 106 with the corresponding actuator 160, 162 will cause the tires of the central frame section 102 to become displaced from the underlying surface 304. In this situation, the position control system 408 may have capacity to apply further downforce at the tire sensor 302 that is out of threshold but the controller 402 will identify that doing so will cause one or more of the tire sensors 302 of the central frame section 102 to move out of the threshold range. Accordingly, in this scenario the controller 402 will determine that the position control system 408 has no further adjustment capacity and the controller 402 will implement box 516.

As described above, the position control system 408 may utilize any of the actuators of the implement described herein, including, but not limited to, the first and second side actuators 160, 162, the fore-aft actuator 176, the tool actuators 208, the first and second actuators 222, 224, or any other moveable component of the implement. In one nonexclusive example, a weight may be coupled to the implement and moveable via actuators or the like with the controller 402. The weight may be selectively repositionable on the implement to provide additional downforce to selected areas of the implement. Accordingly, this disclosure considers many different embodiments of a position control system 408.

If the controller 402 identifies that the position control system 408 has more capacity to provide additional downforce at the location of the tire sensor 302 that is not within the threshold, the controller 402 may implement box 518. In box 518, the controller 402 adjusts the position control system 408 to provide additional downforce to the location that is indicating a tire sensor 302 value outside of the threshold. In one non-exclusive example, a tire on the third pair of wheels 130 of the first frame section 104 may have a tire sensor 302 value that is not within the threshold value. In box 518, the controller 402 may extend the first side actuator 160 to provide additional downforce to the third pair of wheels 130 and monitor the tire sensor 302 values. The controller 402 may continue to adjust the first side actuator 160 until the tire sensor 302 value of the third pair of wheels 130 is within the threshold range. Alternatively, the controller 402 may reach a position where the position control system 408 is not further adjustable as described above and the controller 402 implements box 516.

As described above, box 518 can implement any known method of increasing the downforce of a given area. Including manipulating hydraulic, pneumatic, electric actuators, moving weighted members positioned on the implement, and modifying which ground working implements contact the underlying surface to name a few non-exclusive examples.

While manipulating the first side actuator 160 is described in detail above, this disclosure contemplates manipulating any of the actuators 160, 162, 176, 208 described herein that are capable of providing additional downforce to a given section of the implement. The controller 402 may have responses stored therein where each region of the implement that may be out of threshold has an assigned response that the controller 402 may implement with the position control system 408 to increase the downforce of the out of threshold region.

More specifically, if the second frame section 106 has a tire sensor 302 out of threshold, the controller 402 may apply more pressure to the base end of the second actuator 162 or otherwise extend the second actuator 162 to apply greater downforce to the second frame section 106. Similarly, if an aft region of the implement indicates a tire sensor value that is out of threshold, the controller 402 may apply more pressure to the base end of the fore-aft actuator 176 or otherwise extend the actuator 176 to apply greater downforce to the aft portion of the implement.

In one non-exclusive example, the controller 402 may move a weight along the implement to be positioned proximate to the tire sensor 302 that is not within the threshold value. In this embodiment, a weighted sled or the like may be slidably positioned on a top portion of the implement and moveable therealong with actuators or the like. The controller 402 may address the out of threshold sensor by positioning the weighted sled over the out of threshold sensor to increase the downforce applied thereto.

In yet another embodiment of the present disclosure, the controller 402 may disengage select working tools 316 from the underlying surface 304 to allow a greater downforce to the implement. As one non-exclusive example of this embodiment, the rear attachments 170, 172, 174 may be raised off the underlying surface responsive to a sensor being out of threshold. The controller 402 may send a command to an actuator or the like positioned along the rear attachments 170, 172, 174 to raise the corresponding attachment when a sensor is out of threshold. In another non-exclusive example, the controller 402 may adjust the tool angle 214, 216 with the front tool actuator 208 to an angle that provides less resistance from the underlying surface responsive to a sensor indicating values out of threshold.

In one aspect of this disclosure, the user may identify a priority in which the controller 402 responds to a sensor value out of the threshold value. In this example, the user may utilize inputs of the user interface 406 to establish in what order the controller 402 should adjust the position control system 408. In one non-exclusive example, the user may establish that the controller 402 should first utilize the actuators 160, 162 to address the section of the implement that is out of the threshold. If adjusting the actuators 160, 162 doesn't work, the controller 402 may adjust the tool angle 214, 216. If the corresponding sensor still indicates a value out of threshold, the controller 402 may raise the rear attachments 170, 172, 174.

The user may establish any priority sequence that implements any of the methods described herein for increasing the down force of a given area, and the above example is meant only to be one example of such an embodiment. Accordingly, this disclosure considers any priority sequence of the methods described herein for increasing the downforce.

In one aspect of this disclosure, the controller 402 may automatically set a shallower desired working tool depth in box 516. More specifically, in box 516 the controller has identified that the implement is not properly engaging the underlying surface 304 and the position control system 408 does not have any more capacity to increase the downforce on the affected areas of the implement. In this situation, the controller 402 may automatically reduce the desired tool depth to a tool depth that allows each of the tire sensors 302 to indicate values within the threshold stored in the controller 402. In other words, the controller 402 identifies that the user has requested a desired tool depth that is not possible with the current implement configuration and the condition of the underlying surface 304 and the controller 402 reduces the desired tool depth 314 to a value that can be properly implemented.

In one non-exclusive example, the controller 402 may automatically adjust the desired tool depth 314 in box 516 as described above. In this situation, the controller 402 may send a signal to the user interface 406 identifying that the desired tool depth has changed. Alternatively, the controller 402 may send a signal to the user interface 406 indicating that the desired tool depth 314 should be reduced in order to allow the implement to properly engage the underlying surface 304. The user may then choose to adjust the desired tool depth 314 or continue with the desired tool depth that is not properly engaging the underlying surface across the implement.

Figure 6:
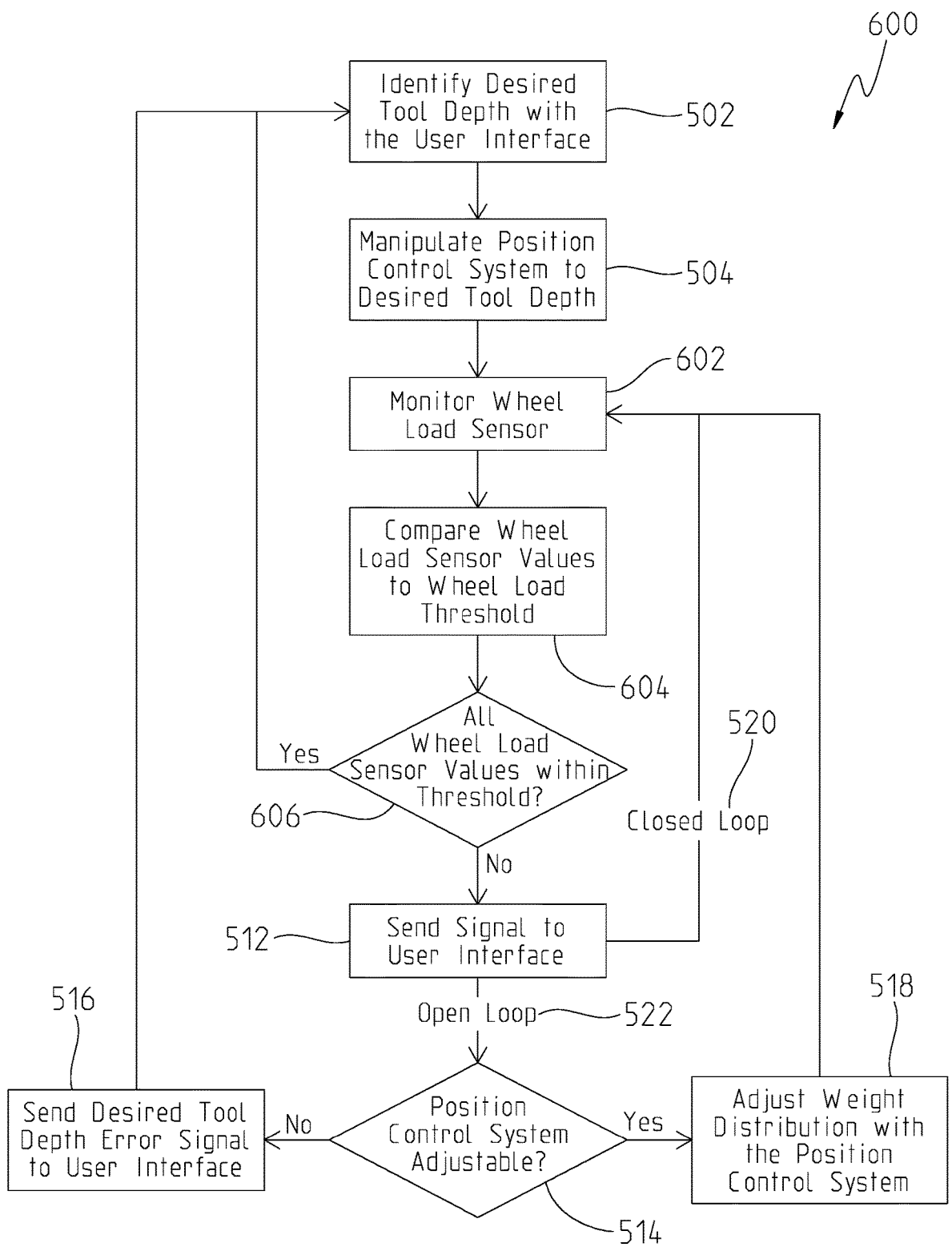
FIG. 6 is a flow chart illustrating another embodiment of a control logic utilizing wheel load sensors.

Referring now to FIG. 6, another embodiment of implement control logic 600 is illustrated. The implement control logic 600 of FIG. 6 may be substantially similar to that of the embodiment described with reference to FIG. 5 with the exception of boxes 602, 604, and 606. More specifically, the implement control logic 600 may function similarly to that described above but utilize the wheel load sensors 306 to compare a wheel load sensor 306 value to a wheel load threshold in boxes 602, 604, 606 instead of utilizing the tire sensors 302 described above. Accordingly, the above description for the implement control logic 500 is hereby incorporated herein with the wheel load sensors 306 replacing the portions referring to the tire sensors 302 and the corresponding threshold values.

In the implement control logic 600, the wheel load sensors 306 may be monitored by the controller 402 in box 602 to identify the load applied on the corresponding pair of wheels 118, 120, 130, 136. As described above, the wheel load sensors 306 may be positioned along a structural component that couples the wheels to the frame such as an axle or the rock shaft. Accordingly, the load applied to the frame from the wheels is identified by the wheel load sensors 306. The wheel load sensors 306 may be strain gauges or the like and are monitored by the controller 402 in a similar way as the tire sensors 302 described above.

The controller 402 may compare the wheel load sensor 306 value to a wheel load threshold in box 604. The wheel load threshold may be a pre-set value stored in the controller 402 that corresponds with the expected load on the wheels when the wheels are properly engaging the underlying surface 304. In one non-exclusive example, the wheel load threshold may be a value that indicates the corresponding wheels are substantially contacting the underlying surface 304. In other words, when the wheel load sensor 306 value is not within the wheel load threshold, the ground working tools 316 are substantially lifting the correspond wheel or wheels off the underlying surface 304.

In box 606, the controller 402 determines whether each of the wheel load sensor 306 values are within the wheel load threshold. There can be any number of wheel load sensors 306 positioned throughout the implement and this disclosure considers positioning a wheel load sensor 306 at only some or all locations of an implement that has wheels or other ground engaging mechanism meant to move along the underlying surface 304. The controller logic 600 may also have the closed loop 520 or open loop 522 options described above with reference to FIG. 5. Further, the open loop 522 may identify if the position control system has any more capacity in box 514 and either send the error signal from box 516, adjust the desired tool depth to a value that is attainable, or adjust the weight distribution with the position control system 408 in box 518.

Accordingly, in one aspect of this disclosure the control logic 600 may be substantially the same as the control logic 500 except the load being applied through the interaction of the tires with the underlying surface is determined utilizing sensors located on different portions of the implement. While specific examples of sensor locations have been described herein, these examples are meant to be illustrative and this disclosure considers implementing other sensors and locations as well.

Figure 7:
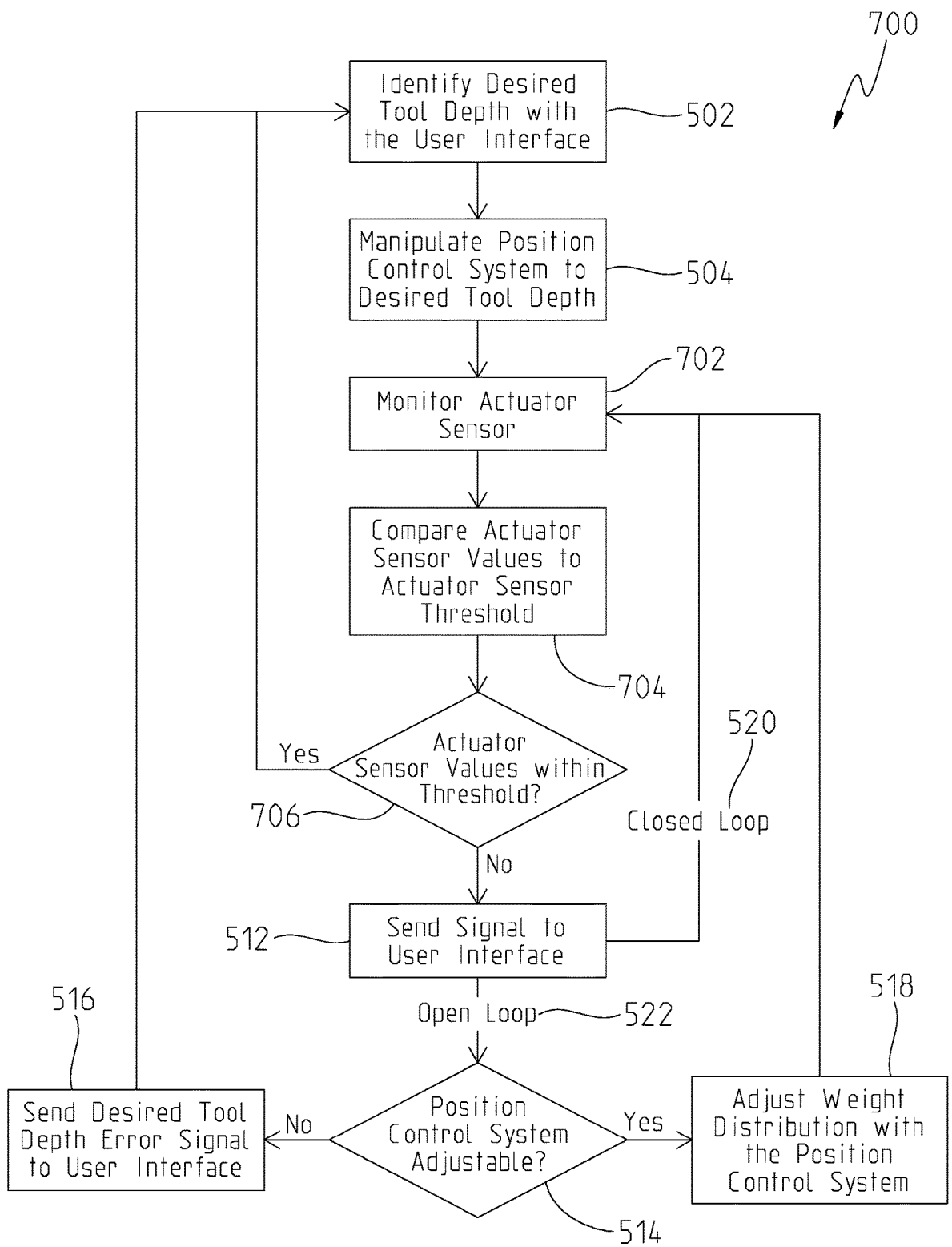
FIG. 7 is a flow chart illustrating another embodiment of a control logic utilizing actuator sensors.

Referring now to FIG. 7, yet another embodiment of implement control logic 700 is illustrated. The implement control logic 700 of FIG. 7 may be substantially similar to that of the embodiment described with reference to FIG. 5 with the exception of boxes 702, 704, and 706. More specifically, the implement control logic 700 may function similarly to that described above but utilize one or more of the actuator sensors 308, 310, 312 to compare an actuator sensor 308, 310, 312 value to an actuator load threshold in boxes 602, 604, 606 instead of utilizing the tire sensors 302 described above. Accordingly, the above description for the implement control logic 500 is hereby incorporated herein with the actuator sensors 308, 310, 312 replacing the portions referring to the tire sensors 302 and the corresponding threshold values.

In one embodiment of the implement control logic 700, one or both of the shaft side sensor 308 and the base side sensor 310 may be monitored by the controller 402 in box 702 to identify the load applied to the corresponding first or second frame section 104, 106. As described above, the shaft side sensor 308 may be fluidly coupled to a shaft side of each cylinder for the first or second actuator 160, 162. Similarly, the base side sensor 310 may be fluidly coupled to a base side of each cylinder for the first and second actuator 160, 162. Further, a shaft side sensor 308 and a base side sensor 310 may be fluidly coupled to each of the actuators 160, 162 to identify a fluid pressure associated with the corresponding chambers of the actuators 160, 162. Accordingly, the load applied to the corresponding first and second frame sections 104, 106 may be identified by monitoring the fluid pressures with the shaft side sensors 308 and the base side sensors 310.

In another embodiment of the implement control logic 700, a strain gauge 312 is positioned on the shaft of each actuator 160, 162 and may be monitored by the controller 402 in box 702 to identify the load applied to the corresponding first or second frame section 104, 106. The strain gauges 312 may be coupled to the shaft of the actuators 160, 162 to identify a strain or other load being transferred through the actuators 160, 162. Accordingly, the load applied to the corresponding first and second frame sections 104, 106 may be identified by monitoring the strain gauge 312 values.

Regardless of the sensor used to identify the load being transferred through the actuators 160, 162, the controller 402 may compare the actuator sensor 308, 310, 312 value to an actuator threshold in box 704. The actuator threshold may be a pre-set value stored in the controller 402 that corresponds with the expected load or pressure applied to the corresponding actuators 160, 162 when the wheels and ground working tools 316 are properly engaging the underlying surface 304. In one non-exclusive example, the actuator threshold may be a value that indicates the corresponding wheels of the frame sections 104, 106 are substantially contacting the underlying surface 304. In other words, when the actuator sensor 308, 310, 312 value is not within the actuator threshold, the ground engaging tools are substantially lifting the corresponding wheel or wheels of the first or second frame section 104, 106 off the underlying surface 304.

In box 706, the controller 402 determines whether one or more of the actuator sensor 308, 310, 312 values are within the actuator threshold. The controller 402 may compare any one of the actuator sensors 308, 310, 312 to a corresponding actuator threshold in box 706. Further, the controller 402 may compare each of the actuator sensors 308, 310, 312 to a corresponding threshold in box 706. Further still, the controller 402 may compare any combination of the actuator sensors 308, 310, 312 to corresponding actuator thresholds in box 706. A person having skill in the relevant art of this disclosure understands the many different sensors and methods that can be used to identify the load being distributed through an actuator, and this disclosure considers all methods and sensors known in the art at the time of the disclosure.

The controller logic 700 may also have the closed loop 520 or open loop 522 options described above with reference to FIG. 5. Further, the open loop 522 may identify if the position control system has any more capacity in box 514 and either send the error signal from box 516, adjust the desired tool depth to a value that is attainable, or adjust the weight distribution with the position control system 408 in box 518.

Accordingly, in one aspect of this disclosure the control logic 700 may be substantially the same as the control logic 500 except the load being applied through the interaction of the tires with the underlying surface is determined utilizing sensors located on different portions of the implement such as the actuators 160, 162. While specific examples of sensor locations have been described herein, these examples are meant to be illustrative and this disclosure considers implementing other sensors and locations as well.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An implement, comprising:
   a frame;
   a ground working tool coupled to the frame;
   a hydraulic system;
   a ground engaging mechanism pivotally coupled to the frame wherein the hydraulic system is coupled to both the frame and the ground engaging mechanism;
   a load identifying sensor configured to identify a load value acting on the ground engaging mechanism;
   a controller configured to communicate with the load identifying sensor; and
   a user interface configured to communicate with the controller, the user interface configured to accept a desired tool depth of the ground working tool;
   wherein, the controller is configured to alter the ground engaging mechanism using the hydraulic system to position the ground working tool at the desired tool depth;
   wherein, the controller is configured to initiate a response when the load value is not within a load threshold and the working tool is positioned at the desired tool depth relative to the frame;
   wherein, the load identifying sensor comprises a pressure sensor that is configured to identify a pressure of the hydraulic system to determine the load value.

2. The implement of claim 1, further wherein the response comprises a signal to a user through the user interface.

3. The implement of claim 1, further wherein the response comprises repositioning the ground engaging mechanism relative to the frame with the hydraulic system.

4. The implement of claim 1, further wherein the ground working tool comprises a plurality of ground working mechanisms coupled to the implement, wherein the response comprises raising one or more of the ground working mechanisms above an underlying surface.

5. A system for monitoring engagement of an implement with an underlying surface, comprising:
   a first frame segment;
   a second frame segment pivotally coupled to the first frame segment;
   a work tool coupled to at least one of the first frame segment and the second frame and having a tool angle defined relative to a transverse axis of the implement;
   a positioning system coupled to the first frame segment and the second frame segment, the positioning system configured to reposition the second frame segment relative to the first frame segment;
   a load sensor configured to identify a load value acting on the second frame segment;
   a controller configured to communicate with the load sensor and the positioning system;
   a user interface configured to communicate with the controller and configured to accept a user input for a desired tool depth of the work tool;
   wherein, the controller initiates a response when the load value is not within a load threshold and the work tool is positioned at the desired tool depth relative to the implement;
   further wherein, the response initiated by the controller includes an indication that the desired tool depth is greater than a maximum tool depth.

6. The system for monitoring engagement of the implement of claim 5, further wherein the positioning system comprises a hydraulic system and the load value comprises a hydraulic pressure.

7. The system for monitoring engagement of the implement of claim 5, further wherein the response initiated by the controller includes manipulating the orientation of the second segment relative to the first segment with the positioning system.

8. The system for monitoring engagement of the implement of claim 7, further comprising manipulating the orientation of the second segment relative to the first segment until the load value is within the load threshold.

9. The system for monitoring engagement of the implement of claim 5, further comprising a ground engaging mechanism coupled to the second frame segment, wherein the load sensor is coupled to the ground engaging mechanism.

10. The system for monitoring engagement of the implement of claim 5, further comprising a plurality of ground working mechanisms, wherein the response initiated by the controller includes raising at least one ground working mechanism above an underlying surface.

11. The system for monitoring engagement of the implement of claim 5, further wherein the response initiated by the controller includes providing the indication with the user interface.

12. The system for monitoring engagement of the implement of claim 5, further comprising a tire and the load sensor comprises a tire pressure sensor that is monitored by the controller to determine the load value.

13. The system for monitoring engagement of the implement of claim 5, further comprising a tire and the load sensor comprises a tire deflection sensor that is monitored by the controller to determine the load value.

14. The system for monitoring engagement of the implement of claim 5, further wherein the load sensor comprises a strain gauge positioned to identify a load on a ground engaging mechanism, wherein the strain gauge is monitored by the controller to determine the load value.

15. A method of controlling the height of an implement over an underlying surface, comprising:
   providing a ground engaging mechanism, a load identifying sensor, at least one ground working tool, and a controller in communication with the load identifying sensor;
   storing, in the controller, a load value threshold;
   identifying a desired tool depth of the at least one ground working tool;

modifying the implement to position the at least one ground working tool at the desired tool depth;

monitoring, with the controller using the load identifying sensor, a load acting on the ground engaging mechanism as the at least one ground working tool is transitioned to the desired depth; and initiating a response, with the controller, when the load acting on the ground engaging mechanism is not within the load value threshold.

16. The method of controlling the height of an implement of claim 15, further comprising reducing the desired tool depth during the initiating the response step.

17. The method of controlling the height of an implement of claim 15, further comprising:

providing a first ground working mechanism, a second ground working mechanism, and a user interface, storing a user preference, in the controller through input on the user interface, identifying a priority sequence for the first ground working mechanism and the second ground working mechanism;

altering the orientation of first ground working mechanism and the second ground working mechanism in the priority sequence identified by the user preference during the initiating the response step.

18. The method of controlling the height of an implement of claim 15, further comprising:

providing a first frame segment and a second frame segment pivotally coupled to one another with a hydraulic system; and applying increased fluid pressure, with the controller, to the hydraulic system to increase the torsional force applied between the first wing segment and the second wing segment as part of the initiating the response step.

19. The method of controlling the height of an implement of claim 15, further wherein the position of the implement is modified by a hydraulic system and the controller has a loaded wheel pressure threshold stored therein and when the load identifying sensor identifies a pressure value from an actuator of the hydraulic system that is not within the loaded wheel pressure threshold, the controller identifies that a maximum tool depth is established.

20. The method of controlling the height of an implement of claim 15, further wherein if the load acting on the ground engaging mechanism is not within the load value threshold as the at least one ground working tool is lowered to the desired depth, the controller identifies that a maximum tool depth is established through a user interface.

* * * * *